B. L. MINK.
ATTACHMENT FOR FLAGPOLES.
APPLICATION FILED NOV. 27, 1911.
1,035,990.
Patented Aug. 20, 1912.
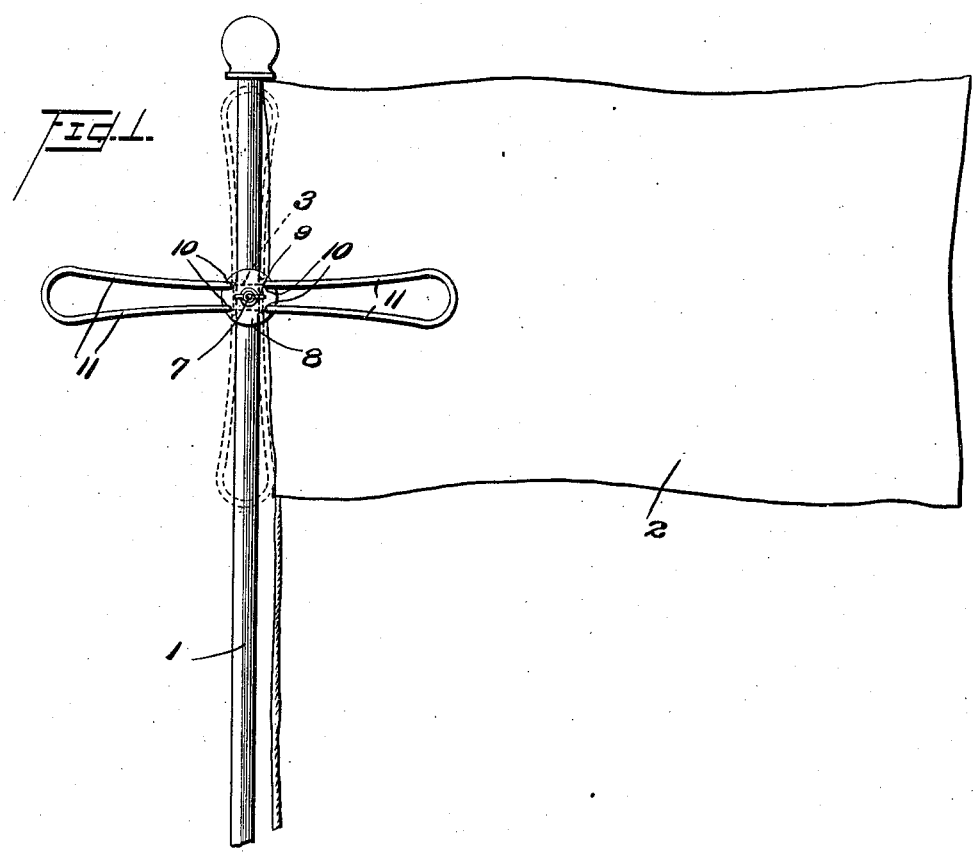
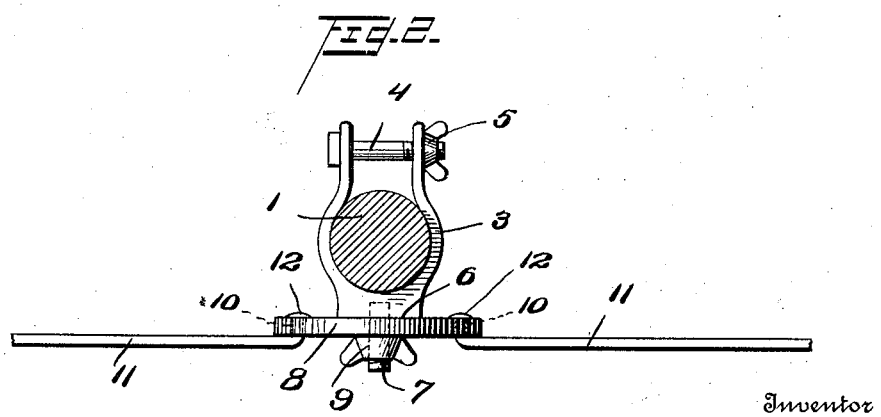

UNITED STATES PATENT OFFICE.

BENJAMIN L. MINK, OF PHILADELPHIA, PENNSYLVANIA.

ATTACHMENT FOR FLAGPOLES.

1,035,990.  Specification of Letters Patent.  Patented Aug. 20, 1912.

Application filed November 27, 1911. Serial No. 662,582.

*To all whom it may concern:*

Be it known that I, BENJAMIN L. MINK, a citizen of the United States, residing at Philadelphia, in the county of Philadelphia and State of Pennsylvania, have invented certain new and useful Improvements in Attachments for Flagpoles, of which the following is a specification.

My invention relates to an improved attachment for flag poles, the object of the invention being to provide an attachment which may be readily secured to any flag pole, and which will prevent the flag from winding on the pole.

A further object is to provide an attachment of this character which may be manufactured and sold at an extremely low price, and which is adapted when fixed to a pole, to prevent the flag from winding on the pole from either direction. It is well known flags which are left flying in the breeze almost invariably wind themselves around the pole. My invention is designed to prevent this winding of the flag on the pole, and to keep the flag straightened out.

With these and other objects in view, the invention consists in certain novel features of construction and combinations and arrangements of parts, as will be more fully hereinafter described and pointed out in the claims.

In the accompanying drawings: Figure 1, is a view in elevation illustrating my improvements showing the same in operative position in full lines, and in inoperative position in dotted lines. Fig. 2, is a view in section of the rod illustrating my improvements in top plan on an enlarged scale.

1, represents a flag pole, and 2 a flag which is hung thereon. My improved attachment comprises a clamp 3, the open ends of which being connected by a bolt 4, having a wing nut 5 thereon so as to secure the attachment on the pole at any vertical adjustment. One face of this clamp is flattened as shown at 6, and from the center of this flattened face, a bolt 7 projects and is positioned through a central opening in a disk 8, the said disk is clamped against rotary movement by means of a wing nut 9 on the bolt 7, and is provided with four openings 10. These openings 10 are adapted to receive the ends of wire arms 11, and the said ends of the wire arms are up-set on the inner face of the disk as shown at 12 to securely hold the arms to the disk. The arms 11 may, of course, be variously shaped, a preferable shape being shown in which the outer ends are rounded so as to prevent injury from contact with the flag. When the arms are in the position shown in full lines in Fig. 1, the flag 2 cannot wind on the pole, because of contact with one or the other of said arms, and hence the flag will remain straight. When the attachment is not desired for use, the wing nut 9 may be loosened, and the disk 8 turned so as to position the arms in line with the pole as shown in dotted lines in Fig. 1. The wing nut 9 may then be clamped so as to hold the parts in this position, and the attachment will occupy but little space on the pole.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An attachment for flag poles comprising a clamp adapted to be secured to the pole, a disk mounted to turn on the clamp, means for holding the disk against rotary movement, and arms secured to said disk and projecting in opposite directions, substantially as described.

2. An attachment for flag poles comprising a clamp adapted to be secured to the pole, a disk mounted to turn on the clamp, means for holding the disk against rotary movement, said disk having openings therein, and a wire arm bowed between its ends and at its ends projected through said openings and secured in said openings, substantially as described.

3. An attachment of the character described, comprising a clamp, a bolt and nut constructed to secure said clamp on a flag pole, said clamp having a flattened face, a bolt projecting from the flattened face of said clamp, a disk mounted to turn on the bolt and located against said flattened face, a nut on said bolt normally clamping said disk against movement, said disk having openings therein, and wire arms secured at their ends in said openings, substantially as described.

In testimony whereof I have signed my name to this specification in the presence of two subscribing witnesses.

BENJAMIN L. MINK.

Witnesses:
FRANCIS S. MOORE,
C. M. CAMM.

Copies of this patent may be obtained for five cents each, by addressing the "Commissioner of Patents, Washington, D. C."